US010776966B2

(12) United States Patent
Boettcher et al.

(10) Patent No.: US 10,776,966 B2
(45) Date of Patent: Sep. 15, 2020

(54) GRAPH PROCESSING SYSTEM THAT ALLOWS FLEXIBLE MANIPULATION OF EDGES AND THEIR PROPERTIES DURING GRAPH MUTATION

(71) Applicant: Oracle International Corporation, Redwood Shores, CA (US)

(72) Inventors: Jan Boettcher, Redwood Shores, CA (US); Alexander Weld, Mountain View, CA (US); Korbinian Schmid, San Mateo, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/581,820

(22) Filed: Apr. 28, 2017

(65) Prior Publication Data

US 2018/0315228 A1    Nov. 1, 2018

(51) Int. Cl.
*G06T 11/20* (2006.01)
*G06T 11/60* (2006.01)
*G06F 17/10* (2006.01)

(52) U.S. Cl.
CPC ........ *G06T 11/206* (2013.01); *G06F 17/10* (2013.01); *G06T 11/203* (2013.01); *G06T 11/60* (2013.01)

(58) Field of Classification Search
None
See application file for complete search history.

(56) References Cited

U.S. PATENT DOCUMENTS

| 5,760,773 | A | * | 6/1998 | Berman | G06F 1/1626 345/672 |
| 5,999,188 | A | * | 12/1999 | Kumar | G06T 17/20 345/420 |
| 6,038,538 | A | * | 3/2000 | Agrawal | G06Q 10/063 705/7.11 |
| 6,091,424 | A | * | 7/2000 | Madden | G06T 11/206 345/619 |
| 9,710,544 | B1 | * | 7/2017 | Smith | G06T 11/206 |

(Continued)

OTHER PUBLICATIONS

Tulip Team, "Tulip Library", Feb. 14, 2015, URL: https://web.archive.org/web/20150214234735/http://tulip.labri.fr/Documentation/current/tulip-dev/html/tulip_lib.html.*

(Continued)

*Primary Examiner* — David H Chu
(74) *Attorney, Agent, or Firm* — Hickman Palermo Becker Bingham LLP (57) ABSTRACT

Techniques are provided for strategy-based graph simplification. In an embodiment, a computer provides configurable strategies that simplify edges of a graph. A client selects and configures a strategy subset of the configurable strategies to define a particular simplification scheme. The computer simplifies a graph by applying the strategy subset to the graph. In embodiments, predefined classes or other application programming interface (API) is provided to clients to obtain and customize strategy instances, such as with a factory or builder. Strategy instances may be imperative or declarative. A service implementation, such as a graph engine, may be embedded or remoted. Techniques herein provide for reuse and optimization.

44 Claims, 5 Drawing Sheets

(56) References Cited

U.S. PATENT DOCUMENTS

| | | | | |
|---|---|---|---|---|
| 2002/0087275 | A1* | 7/2002 | Kim | G06F 19/26 702/19 |
| 2003/0233642 | A1* | 12/2003 | Hank | G06F 8/433 717/156 |
| 2004/0165777 | A1* | 8/2004 | Lossev | G06K 9/222 382/187 |
| 2006/0133562 | A1* | 6/2006 | Heuscher | G06T 11/006 378/4 |
| 2009/0154374 | A1* | 6/2009 | Jaatinen | H04L 41/085 370/254 |
| 2010/0185993 | A1* | 7/2010 | Baumgartner | G06F 17/504 716/107 |
| 2010/0250744 | A1* | 9/2010 | Hadad | G06F 9/4856 709/226 |
| 2011/0040766 | A1* | 2/2011 | Robinson | G06F 17/3053 707/749 |
| 2011/0267350 | A1* | 11/2011 | Curbera | G06T 11/206 345/440 |
| 2011/0320456 | A1* | 12/2011 | Harischandrakar | G06F 17/30707 707/740 |
| 2012/0114296 | A1* | 5/2012 | Luo | H04N 9/8205 386/224 |
| 2012/0260236 | A1* | 10/2012 | Basak | G06F 11/323 717/132 |
| 2012/0330636 | A1* | 12/2012 | Albou | G06F 19/16 703/12 |
| 2013/0222388 | A1* | 8/2013 | McDonald | G06T 11/206 345/440 |
| 2013/0339290 | A1* | 12/2013 | Lee | G06F 17/10 706/55 |
| 2014/0019490 | A1* | 1/2014 | Roy | G06F 16/2228 707/798 |
| 2014/0074764 | A1* | 3/2014 | Duftler | G06N 5/025 706/47 |
| 2014/0189665 | A1* | 7/2014 | Hong | G06F 8/443 717/151 |
| 2015/0161444 | A1* | 6/2015 | Gallup | G06F 16/51 707/752 |
| 2016/0005196 | A1* | 1/2016 | Awadallah | G06T 11/206 345/440 |
| 2016/0071233 | A1* | 3/2016 | Macko | G06F 16/9024 345/440 |
| 2016/0281497 | A1* | 9/2016 | Tilke | E21B 49/00 |
| 2016/0357720 | A1* | 12/2016 | Thimbleby | G06F 3/1454 |
| 2017/0032103 | A1* | 2/2017 | Nguyen | G06F 19/3481 |
| 2017/0169133 | A1* | 6/2017 | Kim | G06F 17/30958 |
| 2017/0285923 | A1* | 10/2017 | Giral | H04L 41/5058 |
| 2018/0048661 | A1* | 2/2018 | Bird | H04L 63/1416 |
| 2018/0097828 | A1* | 4/2018 | Coskun | H04L 63/1425 |
| 2018/0113713 | A1* | 4/2018 | Cheng | G06F 8/41 |

OTHER PUBLICATIONS

PRQA, "8.1.1 Do not use multiple levels of pointer indirection", Jun. 15, 2015, URL: https://web.archive.org/web/20150615113903/http://www.codingstandard.com/rule/8-1-1-do-not-use-multiple-levels-of-pointer-indirection/.*

Alexandre Eleutério Santos Lourenço, "Java 8: Knowing the New Features—Streams", Feb. 10, 2017, URL: https://web.archive.org/web/20170210092010/https://alexandreesl.com/tag/method-reference/.*

R igraph manual pages, http://igraph.org/r/doc/igraphattributecombination.html, last viewed on May 1, 2017, 3 pages.

Oracle, "The Java Tutorials" Autoboxing and Unboxing, Learning the Java Language, Numbers and Strings, https://docs.oracle.com/javase/tutorial/java/data/autoboxing.html, last viewed May 1, 2017, 2pgs.

Karippai, Naveen, "Learning How References Work in JavaScript", dated Nov. 13, 2016, https://medium.com/@naveenkarippai/learning-how-references-work-in-javascript-a066a4e15600, 7 pages.

Martensen, Dan, "The Anatomy of a JavaScript Function", dated Jan. 16, 2015, https://danmartensen.svbtle.com/the-anatomy-of-a-javascript-function. 9 pages.

Verhas, Peter, "Pointers in Java", https://dzone.com/articles/pointers-in-java, dated Jan. 16, 2016, 3 pages.

* cited by examiner

GRAPH PROCESSING SYSTEM THAT ALLOWS FLEXIBLE MANIPULATION OF EDGES AND THEIR PROPERTIES DURING GRAPH MUTATION

FIELD OF THE DISCLOSURE

This disclosure relates to graph processing. Techniques for strategy-based graph simplification are presented.

BACKGROUND

Graph analysis is a recently popularized methodology in data analytics. In graph analysis, a dataset is represented as a graph where data entities become vertices, and relationships between them become edges of the graph. Through this graph representation, it may be tractable to analyze fine-grained relationships between data entities.

In practice, however, data scientists may find it convenient to (temporarily and/or contextually) mutate the graph into a different form for the sake of analysis or display. For instance, when analyzing a graph composed of phone calls between people, the original graph may have many edges between vertices, as each edge may represent one phone call. However, the data scientist may want to aggregate all the phone calls between the same pair of people into a single edge (i.e. simplifying a graph having multi-edges).

Unfortunately, current graph processing frameworks are not very good at handling contextual graph mutations. For example, systems like Neo4J and GraphX do not support graph mutation at all, and a user needs to expressly rebuild the graph model. In other frameworks, graph mutations are generally inconvenient either, due to a rigid application programming interface (API) and semantics for edge properties. For example, semantics of edge properties may be undefined for when multi-edges are collapsed into one.

Although a network analysis package, iGraph, provides some functionality regarding simplification, its functionality is restricted. The user may only merge properties. Selecting edges based on a criteria is unsupported. Furthermore, API invocation may be unwieldy (unreadable and error prone) because the user should write all parameters in a long list whenever calling the mutation method.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Graph
   2.2 Simplification Scheme
   2.3 Simplification Strategy
   2.4 Customization
   2.5 Tooling
   2.6 Operation
   2.7 Reuse
3.0 Simplification Process
4.0 API With Polymorphism
   4.1 Preparation
   4.2 Simplification
5.0 Example Strategies
   5.1 Redundant Edges
   5.2 Edge Aggregation
6.0 Strategy Builder
   6.1 Merging Example
   6.2 Picking Example
7.0 Optimization
8.0 Pseudocode
9.0 Remoting
10.0 Interactivity
11.0 Hardware Overview 1.0 General Overview Techniques are provided for strategy-based graph simplification. In an embodiment, a computer provides configurable strategies that simplify edges of a graph. A client selects and configures a strategy subset of the configurable strategies to define a particular simplification scheme. The computer simplifies a graph by applying the strategy subset to the graph.

In embodiments, predefined classes or other application programming interface (API) is provided to clients to obtain and customize strategy instances, such as with a factory or builder.

Strategy instances may be imperative or declarative. A service implementation, such as a graph engine, may be embedded or remoted. Techniques herein provide for reuse and optimization.

2.0 Example Computer

Figure 1:
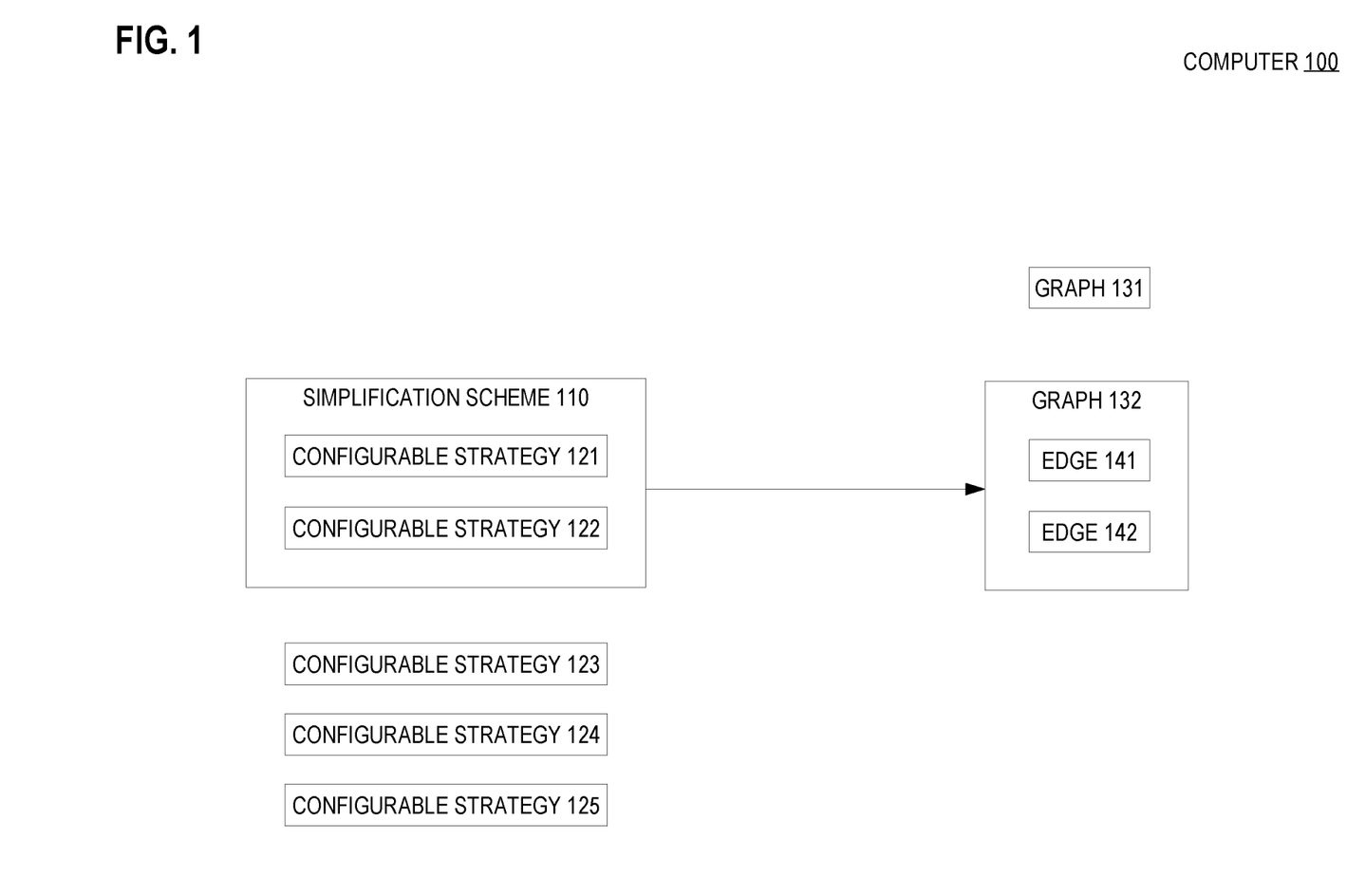
FIG. 1 is a block diagram that depicts an example computer that applies selected strategies to simplify a graph, in an embodiment.

FIG. 1 is a block diagram that depicts an example computer 100, in an embodiment. Computer 100 applies selected strategies to simplify a graph.

Computer 100 may be a rack server such as a blade, a personal computer, a mainframe, a network appliance, a virtual machine, a smartphone, or another computing device. Computer 100 may access data that is stored in memory, on disk, or over a network.

2.1 Graph

Computer 100 contains one or more logical graphs, such as graphs 131-132. Graph 132 may be composed of edges, such as 141-142, that connect vertices (not shown).

One or more data structures may encode the details of graph 132. For example, each of edges 141-142 may be encoded as a separate data structure instance.

Graph 132 may contain many more details than are needed for meaningful display or analysis. For example, edge 141 may have enough properties to clutter a display or complicate analysis. Likewise, edges 141-142 may be redundant by connecting a same pair of vertices.

2.2 Simplification Scheme

To logically simplify graph 132, a client application may apply simplification scheme 110 to graph 132 to achieve a simplification that removes or consolidates some details of graph 132. To achieve simplification scheme 110, the client application may select a subset of available configurable strategies 121-125.

2.3 Simplification Strategy

Each of configurable strategies 121-125 designates a particular technique for simplifying a graph. Configurable strategy 121 may comprise a declarative descriptor, such as extensible markup language (XML) or a procedural logic, such as a script, a class, or a subroutine.

For example, configurable strategy 121 may specify a way to remove redundant edges. Whereas, configurable strategy 122 may specify a way to remove edge properties without removing the edges themselves.

2.4 Customization

Configurable strategy 121 may be an instance within a category of similar strategies. For example, configurable strategies 121-122 may be different customizations or specializations of a same reusable strategy, such as a template, a base class, a prototype, or other generalization.

For example, both configurable strategies 121-122 may designate a same strategy identifier but with different parameters. For example, the strategy identifier may identify a stock (predefined) strategy that has an already-deployed implementation.

Whereas, configurable strategies 121-122 may specify different values for a same parameter of the stock strategy, such as a stock strategy that removes qualifying edges. For example, configurable strategy 121 may specify removal of edges that have an age property whose value exceeds a threshold. Whereas, configurable strategy 122 may specify removal of edges that have a weight property whose value does not exceed another threshold.

A client may design a particular simplification scheme, such as 110, to achieve a particular simplification of graph 132. The client may select which of configurable strategies 121-125 to include in simplification scheme 110. Furthermore, the client may customize the selected configurable strategies by providing desired values for parameters of the selected configurable strategies.

2.5 Tooling

The mechanism by which the client may apply simplification scheme 110 to graph 132 may depend on an embodiment. Although not shown, a client of computer 100 may comprise application software that may or may not be collocated on computer 100 and may or may not share a memory address space into which some or all of graph 132 is loaded.

In embodiments, the client locally or remotely invokes an application programming interface (API), such as with subroutines or classes that are exposed by service implementation software on computer 100. In embodiments, the client delivers, by message or file, a document or descriptor that declaratively configures simplification scheme 110 in a way that the service implementation may readily interpret.

2.6 Operation

In embodiments a configurable strategy, such as 121, may specify criteria for edge retention. For example, configurable strategy 121 may specify retention of edges having a value of an age property that does not exceed one day.

Within simplification scheme 110, some or all of configuration strategies 121-122 may be ranked or otherwise prioritized. For example, each configuration strategy 121-122 may have a numeric parameter that indicates a rank.

For example, simplification scheme 110 may be designed to retain only one edge between each connected pair of vertices. If multiple edges that connect a given pair of vertices are less than a day old, as selected by configurable strategy 121, then configuration strategy 122 may be used to select exactly one edge of the selected edges to retain. For example, configuration strategy 122 may specify selection of a youngest edge of the multiple edges or a weightiest edge.

In embodiments, some or all of configuration strategies 121-122 may be repeatedly applied to edges that connect a same pair of vertices. For example, a pair of vertices may be connected by three edges (not shown), A-C.

Despite needing to select one of three edges to retain, configuration strategy 121 might only be able to choose between two edges. In this case, the service implementation may apply configuration strategy 121 to two of the three edges to decide which of edges A-B to retain and which to discard.

For example, applying simplification scheme 110 may cause an invocation of configuration strategy 121 to discard edge A. During the same applying of simplification scheme 110, configuration strategy 121 may be invoked a second time to decide which of edges B-C should be discarded. Configuration strategy 121 may be repeatedly invoked until only one of edges A-C remains.

In embodiments, applying simplification scheme 110 to graph 132 may directly mutate graph 132, such that graph 132 is actually simplified. In embodiments, graph 132 is not altered (e.g. read only), and applying simplification scheme 110 creates a new graph, such as 131, that represents a simplification of graph 132.

2.7 Reuse

Simplification scheme 110 may be reusable as is or with adjustments between uses. For example, one client may apply simplification scheme 110 to graph 131, and another client may apply simplification scheme 110 to graph 132. Likewise, a client may with a single request apply simplification scheme 110 to both graphs 131-132.

In embodiments, simplification schemes may be combined. In embodiments, simplification scheme 110 may contain other simplification schemes. In embodiments, a client may in a single request apply multiple simplification schemes to graph 132.

3.0 Simplification Process

Figure 2:
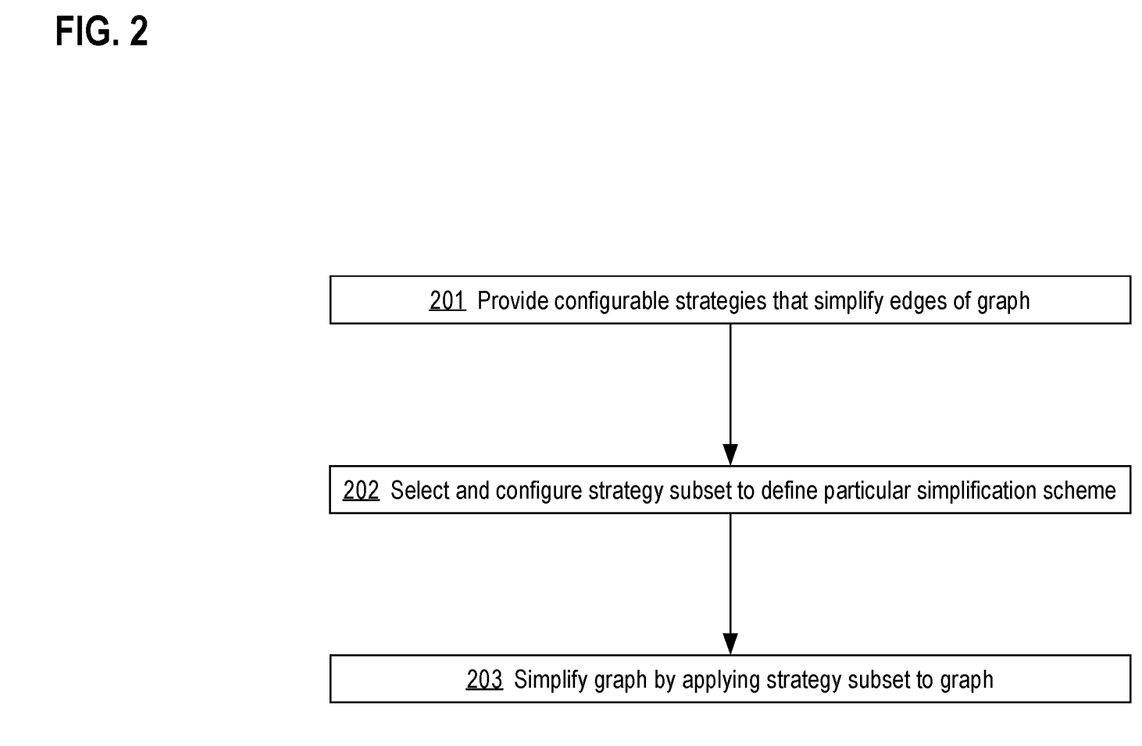
FIG. 2 is a flow diagram that depicts an example process that applies selected strategies to simplify a graph, in an embodiment.

FIG. 2 is a flow diagram that depicts an example process that applies selected strategies to simplify a graph. FIG. 2 is discussed with reference to FIG. 1.

In step 201, configurable strategies that simplify edges of a graph are provided. For example in a Java embodiment, computer 100 may host a graph engine that provides a factory from which instances of configurable strategies may be created or otherwise obtained.

In step 202, a strategy subset is selected and configured to define a particular simplification scheme. For example, an in-process client may ask the factory to create a new instance of a particular type of configurable strategy. For example, the client may indicate a strategy class or an enumeration literal.

The client may customize the configuration of the strategy instance by invoking property setters with desired values. For example, the client may inject names of edge properties to retain or remove into the strategy instance. The client may select and configure a subset of available strategies to define a particular simplification scheme.

In step 203, the strategy subset is applied to a graph to simplify the graph. For example, the graph engine may provide a subroutine that the client may invoke.

To the subroutine, the client may pass the strategy subset and a reference to a loaded graph or an identifier of a graph to load. The invocation causes the strategy subset to be applied to the graph. The client may pass a flag that indicates whether simplification should mutate the existing graph or create a copy.

4.0 API with Polymorphism

Figure 3:
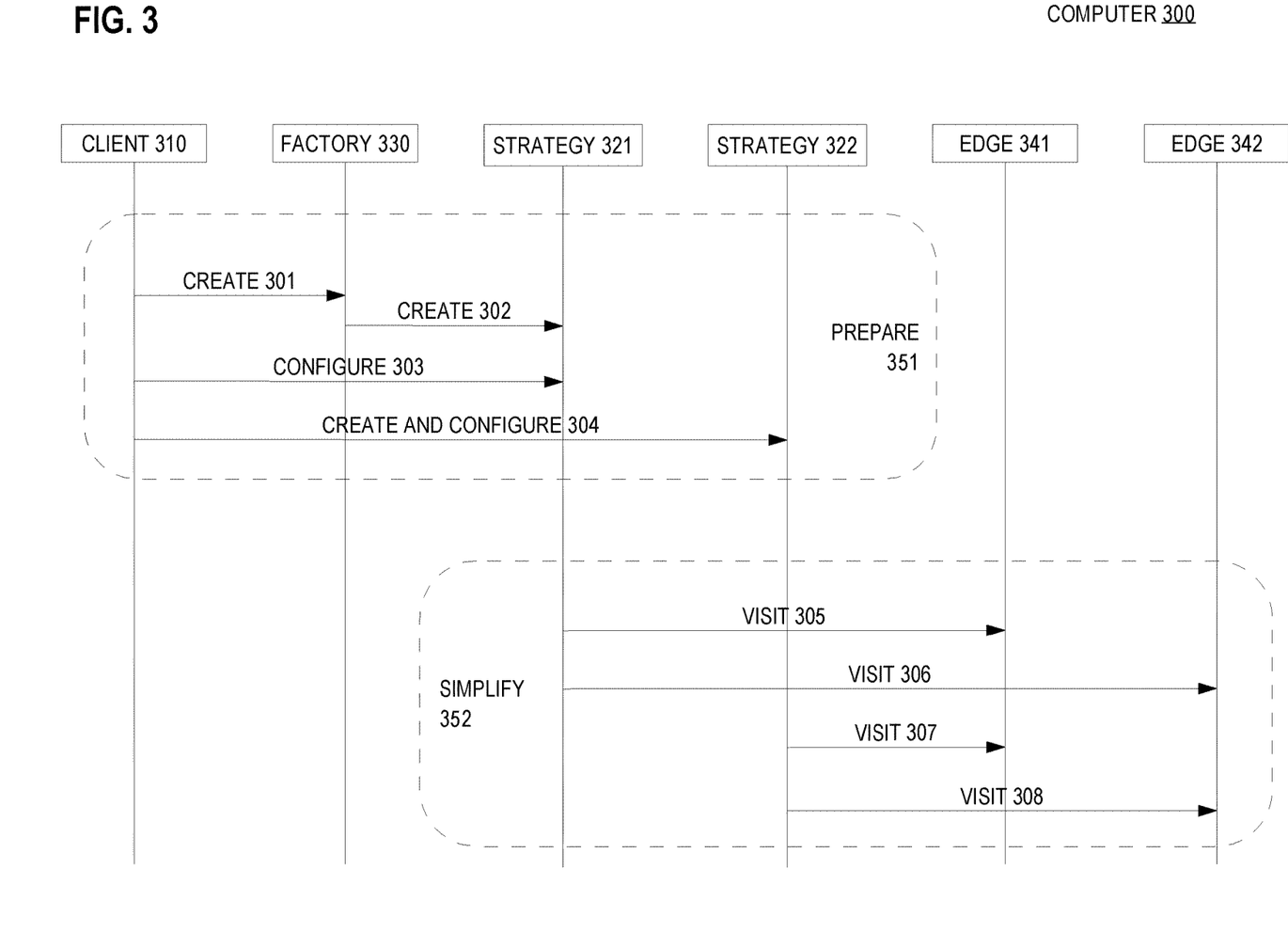
FIG. 3 is a scenario diagram that depicts component interactions within an example computer that uses an API and polymorphism to define and apply a simplification scheme, in an embodiment.

FIG. 3 is a scenario diagram that depicts component interactions within an example computer 300, in an embodiment. Computer 300 uses an API and polymorphism to define and apply a simplification scheme.

Computer 300 may be an implementation of computer 100. Computer 300 includes a graph engine and client 310.

Client 310 may execute within a same software process, memory address space, and codebase as the graph engine. For example, client 310 and the graph engine may execute within a Java virtual machine (JVM).

Client 310 and the graph engine may directly share data structures, object instances, and loaded classes. Client 310 may interact with the graph engine in two phases: prepare 351 and simplify 352.

4.1 Preparation

During prepare 351, client 310 prepares a simplification scheme. In this example, the simplification scheme will include strategies 321-322.

The graph engine may include factory 330, which may be an object or class having factory methods to instantiate or otherwise obtain instances of stock (predefined) strategies. For example, client 310 may invoke create 301 upon factory 330 to obtain strategy 321.

Factory 330 may react to create 301 by reusing an existing strategy instance, such as an immutable strategy that needs no configuration. For example, strategy 321 may be hard-coded to delete self (reflexive) edges (that originate and terminate at a same vertex).

As such, strategy 321 may be shared (reused) without reconfiguration. Factory 330 may cache strategy 321. If strategy 321 has not yet been instantiated (as when client 310 is the first client), factory 330 may react to create 301 by creating strategy 321, shown as create 302.

Factory 330 returns (e.g. by reference) strategy 321 to client 310. If strategy 321 is not shareable because of incompatible expectations of clients, then strategy 321 may be a private instance that client 310 may take ownership of and customize accordingly, shown as configure 303.

The codebase of the graph engine may include a (possibly abstract) base class from which all types of strategies are derived or an interface that all strategies implement. According to such polymorphism, client 310 may implement its own strategy subtype.

For example, client 310 may define a strategy subclass that has user-defined logic that is peculiar to client 310. For example, client 310 may instantiate the subclass as strategy 322 and configure strategy 322 as needed, shown as create and configure 304.

The codebase of the graph engine includes subroutines and classes needed to create and apply simplification schemes. For example, the API may include factory 330, a strategy interface or base class, stock strategies such as 321, and a subroutine for applying a simplification scheme to a graph.

4.2 Simplification

During simplify 352, the simplification scheme is applied to a graph. For example and although not shown, the client may invoke a simplification subroutine of the API that accepts references to the simplification scheme and a graph that is already loaded.

Invocation of the simplification subroutine causes simplify 352 to execute. Simplify 352 may traverse the graph by visiting each edge or vertex and individually apply strategies 321-322 to individual graph edges 341-342.

In embodiments as shown, traversal occurs independently for each strategy 321-322. For example, one concurrent thread may traverse the graph and apply strategy 321 to each edge.

Likewise, another concurrent thread may independently traverse the graph and instead apply strategy 322 to each edge. In embodiments not shown, strategies 321-322 are applied to each edge during a same traversal.

During a traversal, each edge (and/or vertex) may be sequentially visited. For example as shown, strategy 321 processes edge 341 during visit 305 and then processes edge 342 during visit 306.

Each strategy may implement a software design pattern such as visitor or observer. For example, each of strategies 321-322 may override a virtual method by providing a distinct implementation that performs different processing.

For example, both strategies 321-322 may separately implement a visit (edge) method that conforms to a pre-defined signature. However, the method of strategy 321 may perform one simplification, such as removing self edges.

Whereas, the method of strategy 322 may perform another simplification, such as removal of redundant (connecting same vertex pair) edges. An invocation of visit( ) may access one edge, vertices attached to the edge, and/or redundant edges between a pair of vertices. For example, a signature of visit ( ) may take a pair of vertices as parameters.

5.0 Example Strategies

Figure 4:
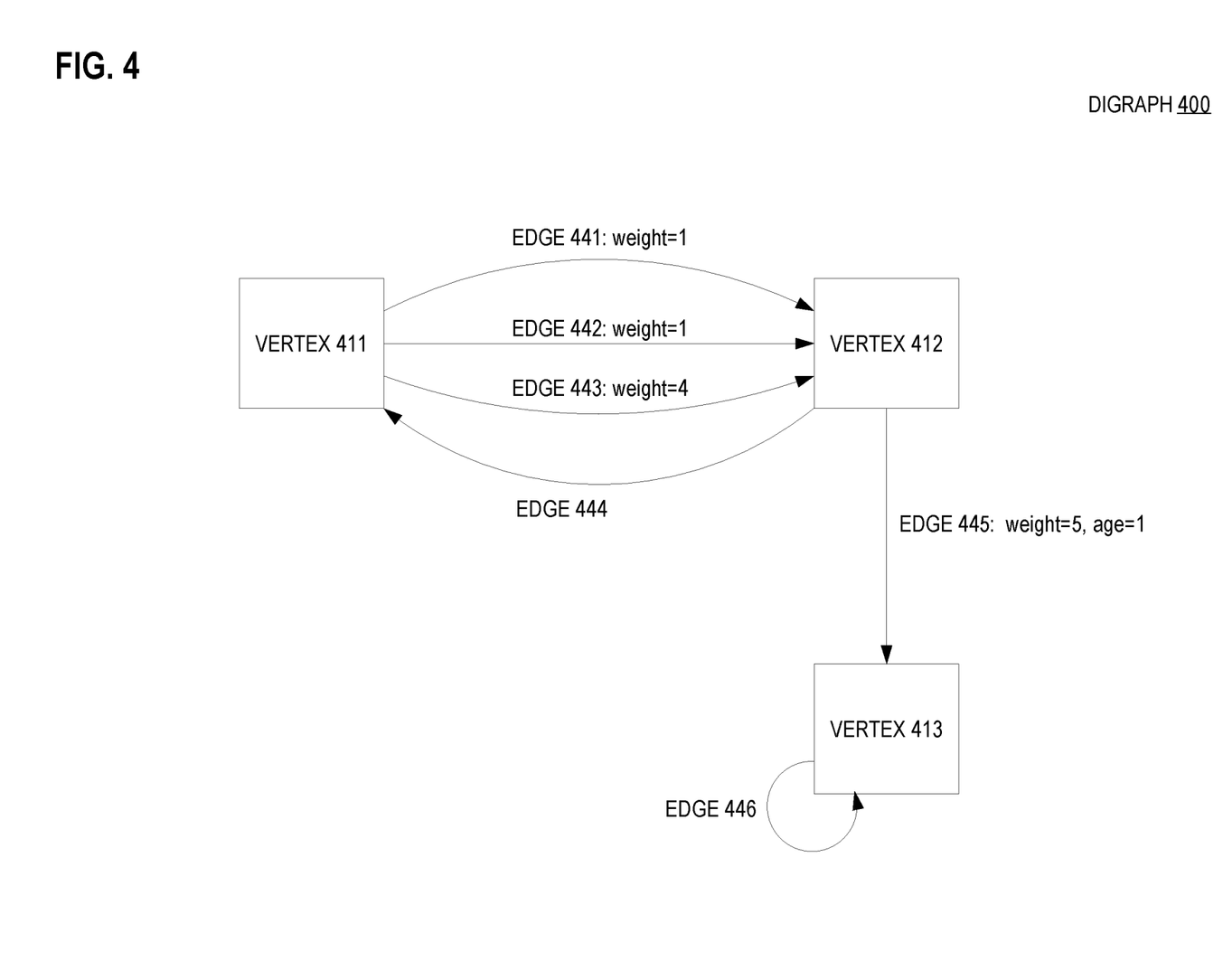
FIG. 4 is a block diagram that depicts an example directed graph that demonstrates example simplification strategies that may be applied, in an embodiment.

FIG. 4 is a block diagram that depicts an example digraph 400, in an embodiment. Digraph 400 is a directed graph that demonstrates example simplification strategies that may be applied.

Digraph 400 contains vertices 411-413. A computer may load digraph 400 into memory and apply a simplification scheme by traversing digraph 400, such as by a depth first or breadth first traversal.

In embodiments, graph traversal order is not predefined. For example, two logically equivalent (same vertices and edges) may be traversed in different orders. For example storage, loading, and mutation history may affect traversal order.

The simplification scheme may include multiple simplification strategies, such as a strategy that removes self edges such as edge 446. Another simplification strategy may remove the direction of edges.

That is, the strategy may convert a directed edge into an undirected edge. For example, edge 445 is directed and may be made undirected (e.g. remove its arrowhead).

A strategy may remove unwanted edge properties or vertex properties. For example, a strategy may be configured to remove an age property or retain only a weight property. For example, the age property of edge 445 may be removed.

5.1 Redundant Edges

Various strategies may process redundant edges in various ways. For example, vertices 411-412 are connected by redundant edges 441-444.

In embodiments, redundant edges may need a same direction. For example, edge 444 may not be redundant because it has an opposite direction of edges 441-443.

A strategy may be configured to select one redundant edge to retain. The strategy may perform the selection based on edge properties.

In embodiments, a redundant edge is randomly selected as a sole survivor. For example, edge 442 is randomly selected for retention, and redundant edges 441 and 443 are removed.

A strategy may remove some redundant edges and retain multiple redundant edges. For example, a strategy may retain edges 441-442 whose weight does not exceed a threshold value of 2 and remove edge 443 that has excessive weight.

5.2 Edge Aggregation

In embodiments, a mathematical aggregation operator is used to select a redundant edge as a sole survivor. For example, a strategy may be configured to select a weightiest edge.

For example, the strategy selects edge 443 because its weight exceeds the weights of edges 441-442. Available mathematical aggregation operators include statistical operators such as: minimum, maximum, sum, count, average, median, mode, or distinct.

Some mathematical aggregation operators, such as sum, count, and average, may be used to synthesize a new edge rather than select an existing edge. The new edge may replace all redundant edges between a pair of vertices.

For example, edges 441-443 may be replaced with a synthetic edge that has an average weight (2), a maximum weight (4), a modal weight (1), a weight sum (6), or a redundant edge count (3).

6.0 Strategy Builder

In embodiments, a client may instantiate and configure a stock strategy by using a predefined strategy builder. A builder is a helper class that simplifies object construction, such as by providing a useful baseline (default) configuration and by exposing simple operations that may wrap (consolidate) complicated customizations.

6.1 Merging Example

A merging strategy may be a stock strategy that combines redundant edges by replacing them with a synthetic edge. In this example, mathematical aggregation operators may be identified by enumeration literals such as SUM and MIN. In this example, a strategy builder offers a fluent interface, which is a programming style that improves human readability by avoiding redundant recitation of a method receiver. That is, an object reference variable may be mentioned once and immediately reused repeatedly for various operations without repeatedly reciting the variable. This may involve method cascading, which enables many methods (member functions) to be applied to an object instance within a long and flowing (hence "fluent") statement. A fluent interface may accelerate keyboard entry of logic because less text is needed. A fluent interface may also increase readability because it consolidates many method invocations into a single statement, which may need less vertical screen space (fewer lines of code), thereby enabling more neighboring statements to simultaneously appear on the screen for visual perusal. The following example logic demonstrates a merging strategy built by a strategy builder that offers a fluent interface:

```
mergingStategyBuilder=graph.createMergingStrategyBuilder( );
mergingStategyBuilder
  .setSelfEdges(KEEPSELFEDGES)
  .setMergingStrategy("distance",SUM)
  .setMergingStrategy("cost",MIN)
  .dropEdgeProperty("unimportantProperty");
```

```
MergingStrategy strategy = mergingStrategyBuilder.build( );
graph.simplify(strategy);
```

6.2 Picking Example

A picking strategy may be a stock strategy that selects one redundant edge as a sole survivor. The following example logic demonstrates a picking strategy and also makes all edges be undirected:

```
pickingStategyBuilder=graph.createPickingStrategyBuilder( );
pickingStategyBuilder
  .setSelfEdges(KEEP_SELF_EDGES)
  .setPickByProperty("cost",MIN)
  .dropEdgeProperty("unimportantProperty");
PickingStrategy strategy=
pickingStrategyBuilder.build( );
graph.undirect(strategy);
```

7.0 Optimization

A graph may be densely encoded in compressed sparse row (CSR) format within minimal memory. Such encoded may place sibling edges (originating from a same vertex) contiguously in memory.

Sibling edges may be secondarily sorted in memory according to their destination vertex. Thus, graph traversal may be more or less accomplished by directly iterating the edges as they occur within memory, such as within an edge array.

Generally, a graph may have more edges than vertices and multiple properties per edge. Thus, the overall cost (latency) of applying a simplification scheme may depend on the cost of accessing edge properties.

Edge property access occurs from within simplification strategies. In an intrusive embodiment, simplification strategies may use (stock or custom) helper classes to streamline edge property access.

In a transparent embodiment, naïve access of edge properties may be automatically replaced with efficient access such as by aspect weaving, bytecode engineering, or other metaprogramming techniques. In a code generating embodiment, strategy object instances are custom configured by a client, and then these object instances are compiled by the graph engine into generated classes that streamline the particular operations that are specified by the custom configuration.

In other words, a more or less data driven implementation may be compiled into hardcoded logic (which may additionally be just-in-time (JIT) compiled into optimal machine code). In Java-8 embodiments, a method reference may facilitate automatic optimization, such as by avoiding dynamic dispatch of a virtual method. For example, a method reference may be more amenable to de-sugaring (e.g. generation and/or optimization of code) than is a lambda expression.

In either a transparent or intrusive embodiment, edge property access may be streamlined by avoiding: autoboxing, unboxing, control-flow branching, and multi-level indirection such as from array indexing, pointers, or hashing. These optimizations may minimize instruction pipeline stalls and garbage collection.

8.0 Pseudocode

Logic that traverses a graph in a reusable way may be included in the graph engine. In object oriented embodiments, the traversal logic may expect polymorphic strategies that conform to an interface, such as for design by contract or inversion of control.

In procedural embodiments, traversal logic instead may include the following pseudo-coded harness. For demonstrative purposes, edge iteration is repeated in various places that could be consolidated for efficiency:

```
void updateEdgeProperties( ) {
    lastDestination=NILVERTEX
    //update depending on edge strategy
    case picking:
        pickedEdge=NILEDGE
        for every edge each in oldGraph
            if isMultiEdge(
                edge.destination,lastDestination)
                    pickedEdge=pickingFunction.pick(
                        pickedEdge,edge)
            else
                //picking is finalized now
                copyPickedEdge(prevEdgeId,pickedEdge)
                //initnewedge
                pickedEdge=edge
                lastDestination=edge.destination
    case merging:
        mergedEdge=NILEDGE
        for every edge each in oldGraph
            if isMultiEdge(
                edge.destination,lastDestination)
                    mergeEdgeValues(mergedEdge,edge)
            else
                //done with merging
                mergedEdge=initNewEdge(edge)
                lastDestination=edge.destination
    case keepAll:
        for every edge in oldGraph
            copyAllProperties(newEdge,edge)
}
boolean isMultiEdge(destination,lastDestination) {
    return destination==lastDestination
}
```

9.0 Remoting

Embodiments of a graph engine may be used by local and/or remote clients. For example, a graph engine may be deployed as a shared service.

Depending on embodiments, a remote client may interact with the graph engine via remote procedure call (RPC) or messaging such as message queuing. RPC may use protocols such as simple object access protocol (SOAP) or Java remote method invocation (RMI).

Messaging may occur to protocols and formats such as extensible markup language (XML), JavaScript object notation (JSON), representational state transfer (REST), or Java object serialization. For example, a strategy interface may extend java.io.Serializable.

XML or JSON enable declarative (not imperative) specification of simplification strategies. For example, the client may send the following JSON to the graph engine to apply a simplification scheme. Line comments are for demonstration only and do not belong in actual JSON:

```
{
    "vertexPropNames": [ ], // if the graph has vertex
properties, their names would appear in this list
    "edgePropNames": [ // a list of names of the edge
properties on which the merging strategy is evaluated. All
properties that are missing in this list will be
dropped/hidden in the new graph (none in this case)
        "cost",
        "unimportantProperty",
        "distance"
```

```
    ],
    "inPlace": false, // the in-place flag indicates
whether to mutate by copying or in-place. it is set to
*false* so the mutation is done by copying
        "newGraphName": null, // if we do mutation by copying,
this field can hold the new unique name of the graph. If it
is null a new name is generated
        "noTrivialVertices": false, // if *true* remove
vertices that don't have any incoming or outgoing edges.
        "edgeStrategy": { // this is the description of the
strategy we're executing
            "strategyType": "MERGE", // we choose to merge
edges
            "noSelfEdges": false, // we choose to keep self-
edges
            "mergingStrategies": [ // this lists the merging
strategies to be used for each edge property in the same
order as the edge properties appear in the "edgePropNames"
list.
                "MIN", // this is the merging strategy for the
property "cost" (as both are the first entry in either
list)
                "MAX", // this is the merging strategy for the
property "unimportantProperty" -- since we didn't
explicitly mention this property in the
mergingStrategyBuilder, the default "MAX" is chosen
                "SUM" // this is the merging strategy for the
property "distance"
            ],
            "labelMergingStrategy": "MAX" // labels are merged
using "MAX"
        }
}
```

In embodiments, the client directly composes JSON as raw text. In embodiments, the graph engine provides (e.g. in a jar file that contains remote proxy stubs) helper classes (such as a strategy builder) that the client uses to generate JSON. For example, the above JSON may be generated by the following client logic:

```
mergingStrategyBuilder.setSelfEdges(KEEP_SELF_EDGES)
    .setPropertyMergingStrategy("distance", SUM)
    .setPropertyMergingStrategy("cost", MIN)
    .setLabelMergingStrategy(MAX);
```

In another example, the following client logic . . .

```
pickingStrategyBuilder.setSelfEdges(REMOVE_SELF_EDGES)
    .setTrivialVertices(REMOVE_TRIVIAL_VERTICES)
    .setPickByProperty("distance", MIN)
    .setCopyMode(MUTATE_IN_PLACE)
    .dropEdgeProperty("unimportantProperty");
``` generates the following JSON:

```
{
    "vertexPropNames": [ ],
    "edgePropNames": [ // notice that "unimportantProperty"
is not listed here: we decided to hide it in the final
graph
        "cost",
        "distance"
    ],
    "inPlace": true, // we decided to do the mutation in-
place
    "newGraphName": null,
    "noTrivialVertices": true, // we decided to remove
trivial vertices in the final graph
    "edgeStrategy": {
        "strategyType": "PICK_BY_PROPERTY", // declaring
```

-continued

```
    that this is a picking strategy
            "noSelf Edges": true, // drop self edges as
requested
            "edgePropertyIndex": 1, // we pick by the *1*st
property mentioned in the "edgePropNames" list (which is
"distance")
            "pickingStrategyFunction": "MIN" // the picking
strategy is "MIN"
        }
    }
```

10.0 Interactivity

In embodiments, a graphical user interface (GUI) enables a user to interactively adjust, supplement, or replace a simplification scheme. For example, a user may incrementally add additional simplification strategies or broaden (adjust) current strategies to achieve progressively greater filtration of visual details (edges and/or their properties) until visual clutter is sufficiently reduced.

In embodiments, adjustment of a simplification scheme may be localized, dynamic, and automatic. For example, a simplification scheme may be locally relaxed to recover previously suppressed details, such as when a pointer hovers over an edge or vertex. For example, the pointer may act somewhat like a magnifying glass that shows extra details within a movable radius.

In embodiments, a user may interactively toggle the expansion or collapse of shown details, such as by selecting (e.g. clicking or lassoing) vertices and edges. In embodiments, details are automatically suppressed to cause visual clutter to fall beneath a threshold.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
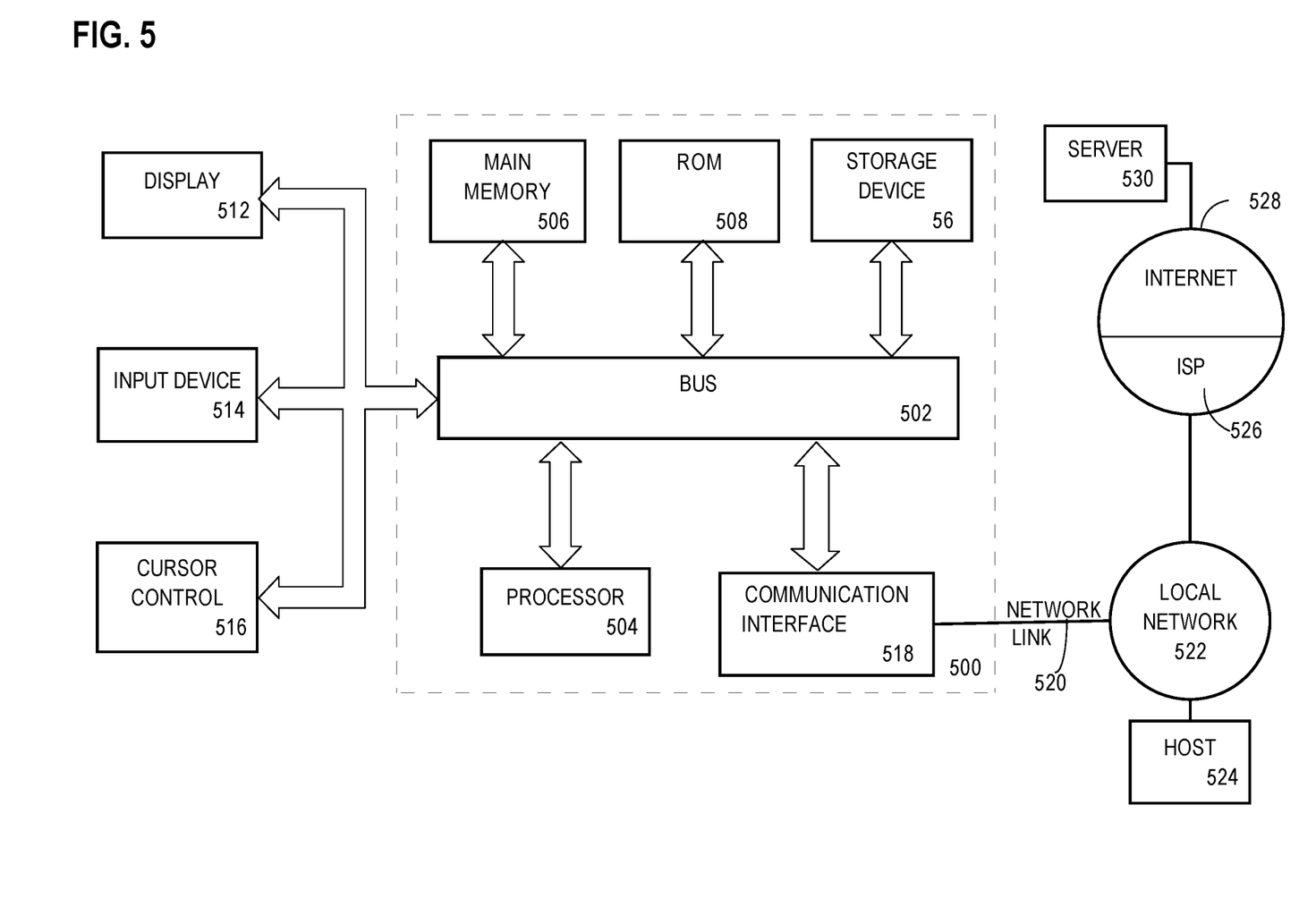
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 56, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 56. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 56. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 56 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 56, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    providing a plurality of configurable strategies that can simplify edges of property graphs that include property values of edge properties of edges;
    dynamically creating a variable amount of instances, including a first strategy instance and a second strategy instance and a third strategy instance, of a same configurable strategy of the plurality of configurable strategies;
    dynamically identifying a first name of a first edge property and a first threshold value to configure the first strategy instance;
    dynamically identifying a second name of a second edge property and a second threshold value to configure the second strategy instance;
    dynamically identifying a third name of a third edge property and a third threshold value to configure the third strategy instance, wherein the first name and the second name and the third name are distinct;
    selecting and configuring a strategy subset, including said variable amount of instances, of the plurality of configurable strategies to define a particular simplification scheme;
    simplifying, after said configuring said strategy subset, a property graph that comprises a plurality of edges by applying the strategy subset to the property graph;
    wherein the method is performed by one or more computers.

2. The method of claim 1 wherein providing a plurality of configurable strategies comprises providing an application programming interface (API).

3. The method of claim 2 wherein providing an API comprises providing one or more factories to instantiate particular strategies of the plurality of configurable strategies.

4. The method of claim 1 wherein the plurality of configurable strategies comprises a strategy that, for each pair of vertices connected by a plurality of edges, selects multiple edges of the plurality of edges to retain.

5. The method of claim 4 wherein applying the strategy subset comprises:
    applying a higher priority strategy of the strategy subset to select an initial subset of the plurality of edges;
    applying a lower priority strategy of the strategy subset to select a single edge of the initial subset.

6. The method of claim 4 wherein applying the strategy subset comprises:
    applying a particular strategy of the strategy subset a first time to select a first edge of the plurality of edges to remove;
    applying the particular strategy a second time to select a second edge of the plurality of edges to remove.

7. The method of claim 4 wherein selects a subset of the plurality of edges comprises selects edges that originate from a first vertex and terminate at a different vertex.

8. The method of claim 1 wherein the plurality of configurable strategies comprises a strategy that, for each pair of vertices connected by a plurality of edges, merges a subset of the plurality of edges into a combined edge.

9. The method of claim 1 wherein the plurality of configurable strategies comprises a strategy that, for each pair of vertices connected by one or more edges, changes at least one edge of the one or more edges from directed to undirected.

10. The method of claim 1 wherein the plurality of configurable strategies comprises a strategy that, for each pair of vertices connected by one or more edges, applies at least one aggregation function selected from the group consisting of: sum, count, average, median, mode, and distinct.

11. The method of claim 10 wherein the at least one aggregation function is applied for at least one selected from the group consisting of: selecting a particular edge to retain, and selecting a particular property value of one edge of the one or more edges.

12. The method of claim 1 wherein applying the strategy subset to the property graph comprises applying the strategy subset to create a new property graph.

13. The method of claim 1 further comprising sending the strategy subset to a remote server that hosts the property graph using at least one selected from the group consisting of: a remote procedure call, and a declarative message.

14. The method of claim 13 wherein sending the strategy subset to the remote server comprises sending at least one selected from the group consisting of: extensible markup language (XML), JavaScript object notation (JSON), and a serialized object-oriented instance.

15. The method of claim 1 wherein the plurality of configurable strategies comprises a strategy that, for each pair of vertices connected by one or more edges, applies a user-defined function.

16. The method of claim 1 wherein selecting and configuring a strategy subset comprises sub-classing at least one of the plurality of configurable strategies.

17. The method of claim 1 wherein the strategy subset comprises a strategy that removes at least one property of an edge.

18. The method of claim 1 wherein:
the edges of the property graph are stored in an array;
edges that originate from a same vertex are stored contiguously within the array.

19. The method of claim 1 wherein an implementation of a strategy of the plurality of configurable strategies accesses, within a data structure that encodes an edge, a property of the edge by using none of: multi-level indirection, auto-boxing, unboxing, or control-flow branching.

20. The method of claim 1 further comprising reusing the strategy subset by applying the strategy subset to a second property graph.

21. The method of claim 1 wherein applying the strategy subset comprises applying multiple subsets of the plurality of configurable strategies.

22. The method of claim 1 wherein an implementation of a strategy of the plurality of configurable strategies uses a method reference to access, within a data structure that encodes an edge, a property of the edge by using none of: multi-level indirection, auto-boxing, unboxing, or control-flow branching.

23. One or more non-transitory computer-readable media storing instructions that, when executed by one or more processors, cause:
providing a plurality of configurable strategies that can simplify edges of property graphs that include property values of edge properties of edges;
dynamically creating a variable amount of instances, including a first strategy instance and a second strategy instance and a third strategy instance, of a same configurable strategy of the plurality of configurable strategies;
dynamically identifying a first name of a first edge property and a first threshold value to configure the first strategy instance;
dynamically identifying a second name of a second edge property and a second threshold value to configure the second strategy instance;
dynamically identifying a third name of a third edge property and a third threshold value to configure the third strategy instance, wherein the first name and the second name and the third name are distinct;
selecting and configuring a strategy subset, including said variable amount of instances, of the plurality of configurable strategies to define a particular simplification scheme;
simplifying, after said configuring said strategy subset, a property graph that comprises a plurality of edges by applying the strategy subset to the property graph.

24. The one or more non-transitory computer-readable media of claim 23 wherein providing a plurality of configurable strategies comprises providing an application programming interface (API).

25. The one or more non-transitory computer-readable media of claim 24 wherein providing an API comprises providing one or more factories to instantiate particular strategies of the plurality of configurable strategies.

26. The one or more non-transitory computer-readable media of claim 23 wherein the plurality of configurable strategies comprises a strategy that, for each pair of vertices connected by a plurality of edges, selects multiple edges of the plurality of edges to retain.

27. The one or more non-transitory computer-readable media of claim 26 wherein applying the strategy subset comprises:
applying a higher priority strategy of the strategy subset to select an initial subset of the plurality of edges;
applying a lower priority strategy of the strategy subset to select a single edge of the initial subset.

28. The one or more non-transitory computer-readable media of claim 26 wherein applying the strategy subset comprises:
applying a particular strategy of the strategy subset a first time to select a first edge of the plurality of edges to remove;
applying the particular strategy a second time to select a second edge of the plurality of edges to remove.

29. The one or more non-transitory computer-readable media of claim 26 wherein selects a subset of the plurality of edges comprises selects edges that originate from a first vertex and terminate at a different vertex.

30. The one or more non-transitory computer-readable media of claim 23 wherein the plurality of configurable strategies comprises a strategy that, for each pair of vertices connected by a plurality of edges, merges a subset of the plurality of edges into a combined edge.

31. The one or more non-transitory computer-readable media of claim 23 wherein the plurality of configurable strategies comprises a strategy that, for each pair of vertices connected by one or more edges, changes at least one edge of the one or more edges from directed to undirected.

32. The one or more non-transitory computer-readable media of claim 23 wherein the plurality of configurable strategies comprises a strategy that, for each pair of vertices connected by one or more edges, applies at least one aggregation function selected from the group consisting of: sum, count, average, median, mode, and distinct.

33. The one or more non-transitory computer-readable media of claim 32 wherein the instructions further cause the at least one aggregation function to be applied for at least one selected from the group consisting of: selecting a particular edge to retain, and selecting a particular property value of one edge of the one or more edges.

34. The one or more non-transitory computer-readable media of claim 23 wherein applying the strategy subset to the property graph comprises applying the strategy subset to create a new property graph.

35. The one or more non-transitory computer-readable media of claim 23 wherein the instructions further cause sending the strategy subset to a remote server that hosts the property graph using at least one selected from the group consisting of: a remote procedure call, and a declarative message.

36. The one or more non-transitory computer-readable media of claim 35 wherein sending the strategy subset to the remote server comprises sending at least one selected from the group consisting of: extensible markup language (XML), JavaScript object notation (JSON), and a serialized object-oriented instance.

37. The one or more non-transitory computer-readable media of claim 23 wherein the plurality of configurable strategies comprises a strategy that, for each pair of vertices connected by one or more edges, applies a user-defined function.

38. The one or more non-transitory computer-readable media of claim 23 wherein selecting and configuring a strategy subset comprises sub-classing at least one of the plurality of configurable strategies.

39. The one or more non-transitory computer-readable media of claim 23 wherein the strategy subset comprises a strategy that removes at least one property of an edge.

40. The one or more non-transitory computer-readable media of claim 23 wherein the instructions further cause:
the edges of the property graph to be stored in an array;
edges that originate from a same vertex to be stored contiguously within the array.

41. The one or more non-transitory computer-readable media of claim 23 wherein an implementation of a strategy of the plurality of configurable strategies is configured to access, within a data structure that encodes an edge, a property of the edge by using none of: multi-level indirection, auto-boxing, unboxing, or control-flow branching.

42. The one or more non-transitory computer-readable media of claim 23 wherein the instructions further cause reusing the strategy subset by applying the strategy subset to a second property graph.

43. The one or more non-transitory computer-readable media of claim 23 wherein applying the strategy subset comprises applying multiple subsets of the plurality of configurable strategies.

44. The one or more non-transitory computer-readable media of claim 23 wherein an implementation of a strategy of the plurality of configurable strategies is configured to use a method reference to access, within a data structure that encodes an edge, a property of the edge by using none of: multi-level indirection, auto-boxing, unboxing, or control-flow branching.

* * * * *

UNITED STATES PATENT AND TRADEMARK OFFICE
CERTIFICATE OF CORRECTION

PATENT NO. : 10,776,966 B2  
APPLICATION NO. : 15/581820  
DATED : September 15, 2020  
INVENTOR(S) : Boettcher et al.

Page 1 of 1

It is certified that error appears in the above-identified patent and that said Letters Patent is hereby corrected as shown below:

In the Specification

In Column 7, Line 61, delete "mergingStategyBuilder" and insert -- mergingStrategyBuilder --, therefor.

In Column 7, Line 62, delete "mergingStategyBuilder" and insert -- mergingStrategyBuilder --, therefor.

In Column 7, Line 63, delete "(KEEPSELFEDGES)" and insert -- (KEEP_SELF_EDGES) --, therefor.

In Column 8, Line 13, delete "pickingStategyBuilder" and insert -- pickingStrategyBuilder --, therefor.

In Column 8, Line 14, delete "pickingStategyBuilder" and insert -- pickingStrategyBuilder --, therefor.

In Column 11, Line 3, delete ""noSelf Edges":" and insert -- "noSelfEdges": --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*